United States Patent
Yilma et al.

(10) Patent No.: US 10,899,279 B2
(45) Date of Patent: Jan. 26, 2021

(54) APPARATUS AND METHOD OF SECURING AN ITEM FOR TRANSPORT IN A VEHICLE

(71) Applicant: FORD GLOBAL TECHNOLOGIES, LLC, Dearborn, MI (US)

(72) Inventors: Benjamin Yilma, Canton, MI (US); Saeed Chehade, Windsor (CA); James Cornell Weaver, Northville, MI (US); Thomas J. Susko, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 16/389,440

(22) Filed: Apr. 19, 2019

(65) Prior Publication Data

US 2020/0331401 A1    Oct. 22, 2020

(51) Int. Cl.
*B60R 7/04* (2006.01)
*B60R 11/00* (2006.01)

(52) U.S. Cl.
CPC .............. *B60R 7/043* (2013.01); *B60R 11/00* (2013.01); *B60R 2011/0012* (2013.01); *B60R 2011/0071* (2013.01)

(58) Field of Classification Search
CPC . B60R 7/043; B60R 11/00; B60R 2011/0012; B60R 2011/0071
See application file for complete search history.

(56) References Cited

U.S. PATENT DOCUMENTS

| | | | |
|---|---|---|---|
| 4,768,828 A | 9/1988 | Kohketsu | |
| 6,267,442 B1* | 7/2001 | Shiino | B60N 2/2809 297/250.1 |
| 6,533,340 B1 | 3/2003 | Gaunzon et al. | |
| 6,601,917 B1* | 8/2003 | Christopherson | B60N 2/2821 24/633 |
| 6,959,954 B2* | 11/2005 | Brandt | B60R 7/10 224/313 |
| 7,918,502 B2 | 4/2011 | Bacon | |
| 10,189,382 B2* | 1/2019 | Sammons | B60N 2/2887 |
| 10,220,790 B2* | 3/2019 | Mozurkewich | B60R 7/10 |
| 10,279,710 B2* | 5/2019 | Wieczorek | B60N 2/26 |
| 2002/0104190 A1* | 8/2002 | Moore | B60N 2/2809 16/231 |

FOREIGN PATENT DOCUMENTS

| | | |
|---|---|---|
| JP | 2004525817 A | 8/2004 |
| JP | 2012245882 A | 12/2012 |
| KR | 101067916 B1 | 9/2011 |

OTHER PUBLICATIONS

English Machine Translation of JP2004525817A dated Aug. 26, 2004.
English Machine Translation of JP2012245882A dated Dec. 13, 2012.
English Machine Translation of KR101067916B1 dated Sep. 28, 2011.

* cited by examiner

*Primary Examiner* — Corey N Skurdal
(74) *Attorney, Agent, or Firm* — David Coppiellie; Price Heneveld LLP

(57) ABSTRACT

An apparatus and method are provided for securing an item for transport in a vehicle. The apparatus includes a tether anchor bezel, having a housing and a displaceable cover, a tether anchor held within the tether anchor bezel, and a hook carried on the displaceable cover.

20 Claims, 11 Drawing Sheets

APPARATUS AND METHOD OF SECURING AN ITEM FOR TRANSPORT IN A VEHICLE

TECHNICAL FIELD

This document relates generally to the vehicle field and, more particularly, to an apparatus and method adapted for securing an item for transport in a vehicle.

BACKGROUND

Users of vehicles, such as motor vehicles and autonomous vehicles, desire and have an expectation to have features that help enable the convenient securing and transport of various items, such as grocery bags, purses, small bags, hats, gloves and the like. Users also often have the desire and need to properly anchor a baby safety or child safety seat within the vehicle. In addition to these needs, users also wish the vehicle to incorporate an aesthetically pleasing appearance. As a consequence, any apparatus adapted for holding or hanging an item must also be cosmetically integrated into the interior of the vehicle.

This document relates to a new and improved apparatus that is aesthetically integrated into the interior of a vehicle and allows ease of use and utmost security as an anchor point for a baby or child safety seat or other tether arrangement. Advantageously, the apparatus also provides a conveniently located hook adapted to hold various and sundry items in a hanging orientation.

SUMMARY

In accordance with the purposes and benefits described herein, a new and improved apparatus is provided that comprises: (a) a tether anchor bezel including a housing and a displaceable cover, (b) a tether anchor within the tether anchor bezel and (c) a hook carried on the displaceable cover.

More particularly, the housing may include a recess defining a compartment. The tether anchor may extend across the compartment within the recess. The cover is displaceable between a first position, at least partially closing the compartment and concealing the tether anchor, and a second position, at least partially opening the compartment and exposing the tether anchor for access and use. More particularly, the hook may be concealed in the compartment when the cover is in the first position and exposed for use when the cover is in the second position.

In one possible embodiment, the hook includes a first prong and a second prong. Further, the hook may include a tether receiver between the first prong and the second prong. That tether receiver allows the passage of a tether between the first prong and the second prong when a tether is connected to the tether anchor and the cover is partially closed.

A pivot may connect the cover to the housing. A latch feature carried on the bezel may releasably secure the displaceable cover in the first position. That latch feature may comprise a resilient tab carried on the housing and configured to engage at least one of the first prong and the second prong when the cover is in the first position. The pivot, connecting the cover to the housing may include opposed trunnions on the cover that are received in opposed sockets in the housing.

In an alternative embodiment, the apparatus comprises: (a) a tether anchor bezel including a housing, (b) a tether anchor within the tether anchor bezel and (c) a hook carried on the housing. That hook includes a first section, a second section and a detent hinge connecting the first section and the second section.

More particularly, the first section of the hook may include a proximal end and a distal end. The proximal end may be connected to the housing by a pivot. The distal end may be connected to the second section by the detent hinge.

The detent hinge functions to bias the hook into an open position for receiving and holding an item that may be hung from the hook. At the same time, the detent hinge will allow the second section of the hook to be displaced toward the first section of the hook in the event it is inadvertently contacted by a knee, shoulder, arm or other object thereby reducing the force of the blow and the potential for any discomfort that might otherwise be caused.

Any of the embodiments of the apparatus may be mounted by means of the tether anchor bezel at any appropriate point inside the vehicle. Potential mounting positions include, but are not limited to, in a rear face of a vehicle seat or in a trim panel.

In accordance with an additional aspect, a method is provided of securing an item for transport in a vehicle. That method comprises the steps of: (a) displacing a cover of a tether anchor bezel into a deployed position and (b) engaging a portion of the item with a hook carried on the cover and exposed for use in the deployed position.

In the following description, there are shown and described several preferred embodiments of the apparatus and the method. As it should be realized, the apparatus and the method are capable of other, different embodiments and their several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and method and together with the description serve to explain certain principles thereof.

FIG. 1 is an exploded perspective view of a first possible embodiment of the apparatus showing the displaceable cover and hook separated from the tether anchor bezel and tether anchor.

FIG. 2 is a schematic side elevational view of the embodiment of the apparatus illustrated in FIG. 1 and showing, in phantom line, the displaceable cover and hook in a first or home position received within the compartment defined by the cover anchor bezel and, in full line, the displaceable cover and hook in a second or deployed position wherein the hook projects from the tether anchor bezel and is in a position to receive and hold an item.

FIGS. 3A-3D are a series of perspective views illustrating how one connects a tether to the tether anchor of the apparatus. More particularly, FIG. 3A illustrates the apparatus with the displaceable cover and hook in the first or home position wherein the tether anchor is concealed from view. FIG. 3B illustrates the displaceable cover and hook in the second or deployed position which allows access to the tether anchor. FIG. 3C illustrates connection of the tether hook to the tether anchor. FIG. 3D illustrates how the displaceable cover and hook may be secured in an at least partially closed position, concealing the tether anchor and providing a more aesthetically pleasing appearance even when the tether hook is connected to the tether anchor.

Figure 5A:
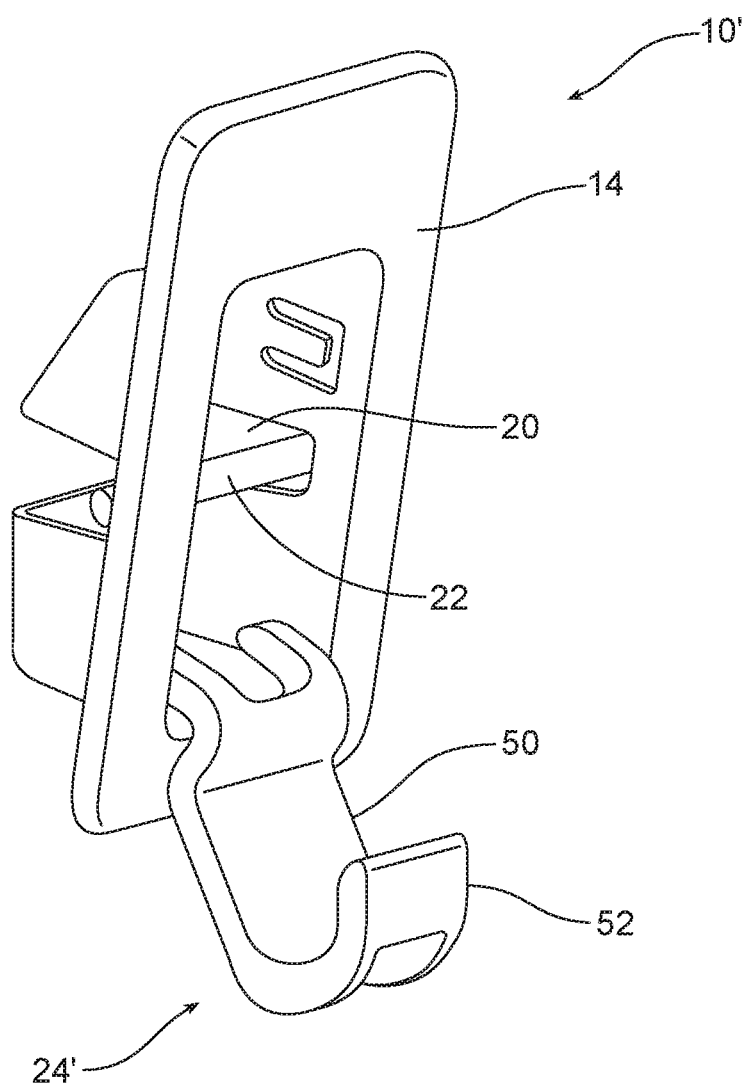
FIGS. 5A-5D illustrate an alternative embodiment of the apparatus wherein the hook includes a first section, a second section and a detent hinge connecting the first section with the second section.
Figure 5B:
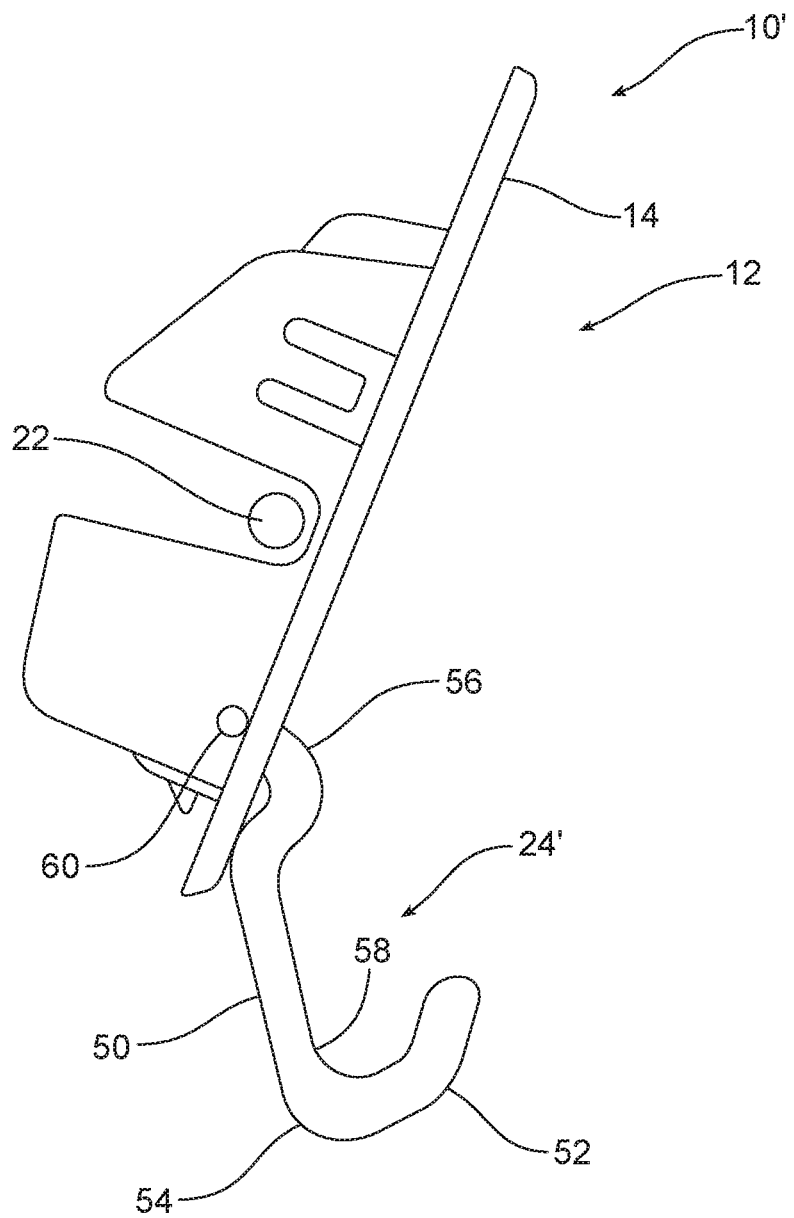
Figure 5C:
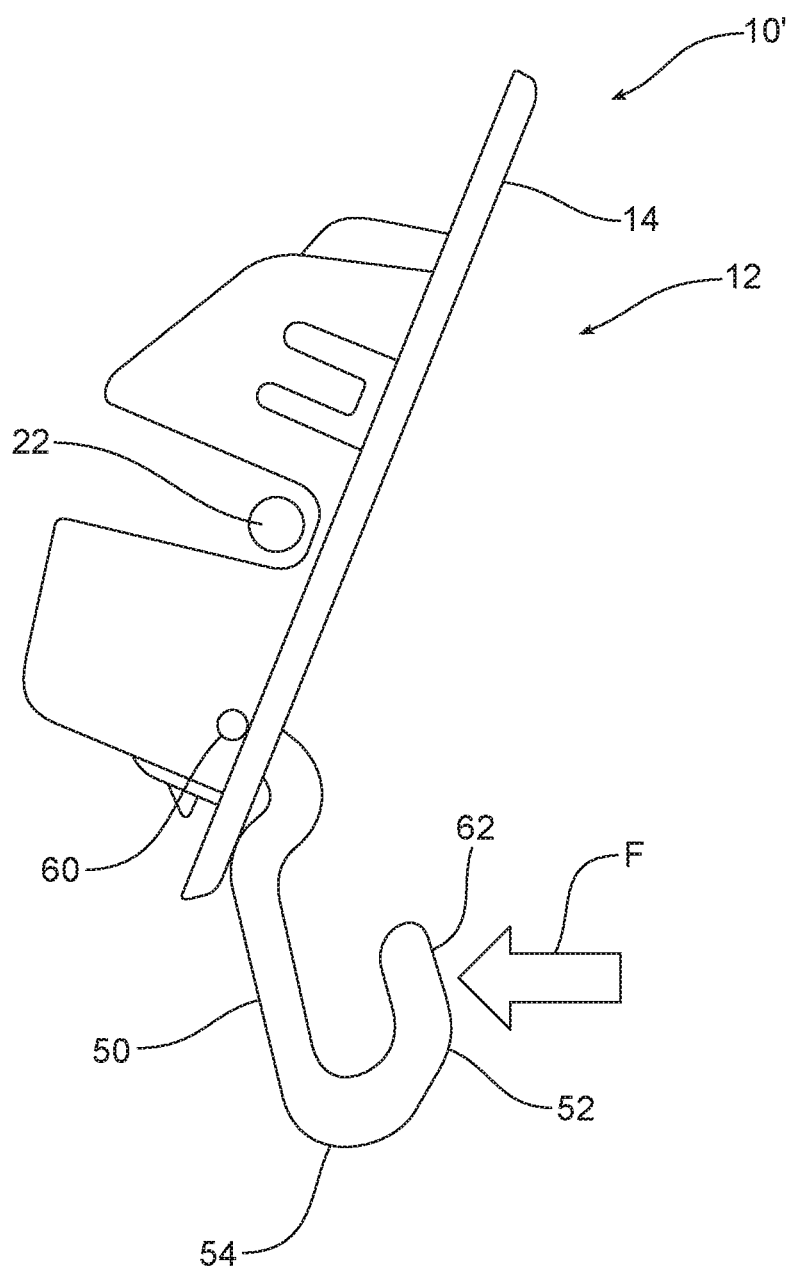
Figure 5D:
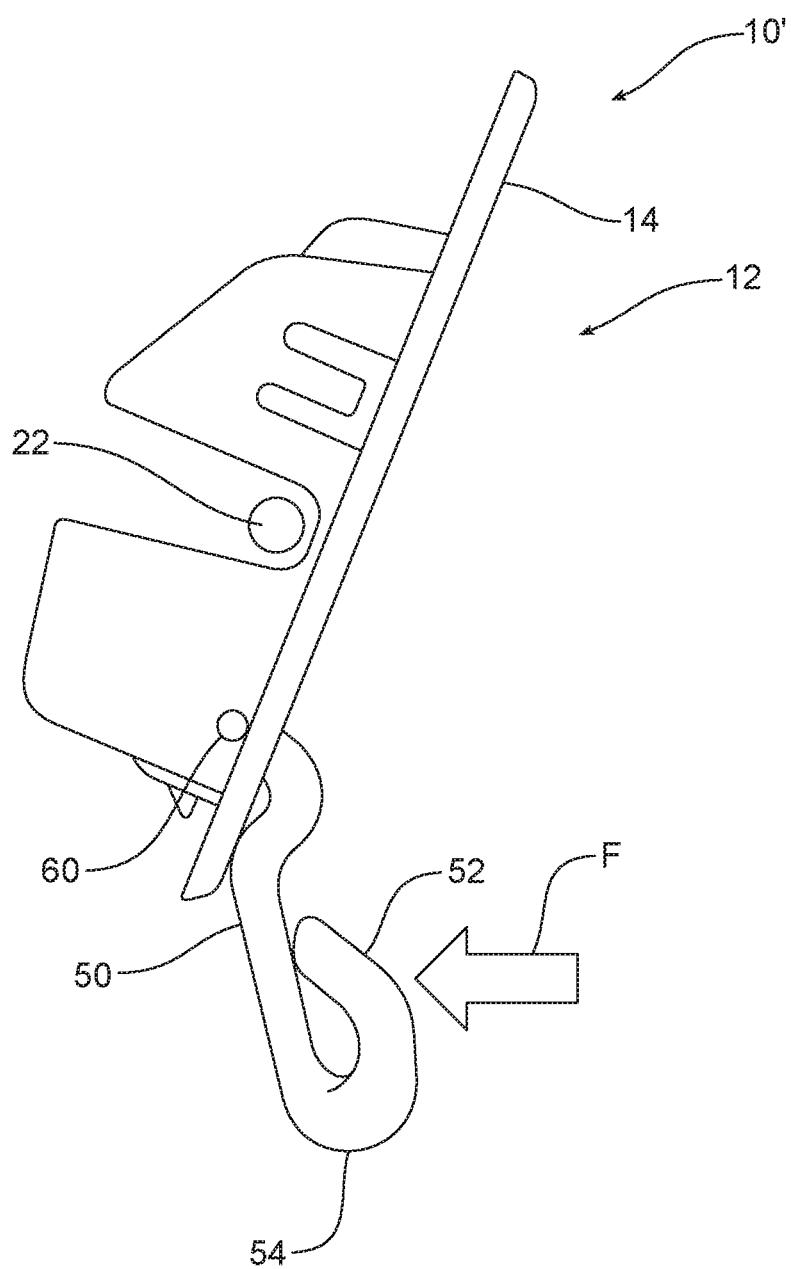

More particularly, FIGS. 5A and 5B are respective perspective and side elevational views illustrating the hook in the second or deployed position. FIGS. 5C and 5D are side elevational views illustrating how the detent hinge allows the second section of the hook to break over about the detent hinge and progressively bend toward the first section when a blunt force is applied in the direction of the indicated action arrows.

Reference will now be made in detail to the present preferred embodiments of the apparatus and method, examples of which are illustrated in the accompanying drawing figures.

DETAILED DESCRIPTION

Figure 1:
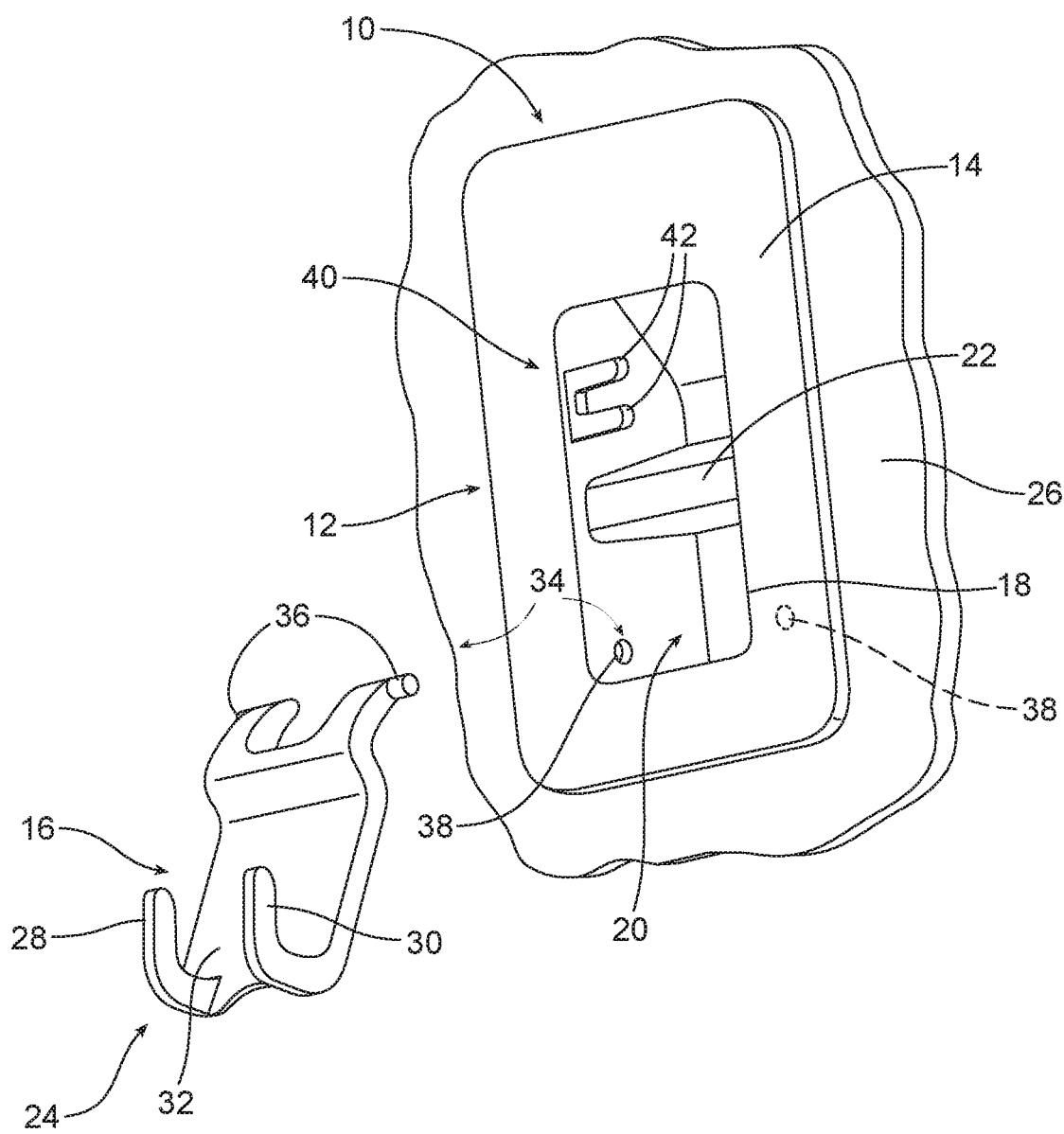
Figure 2:
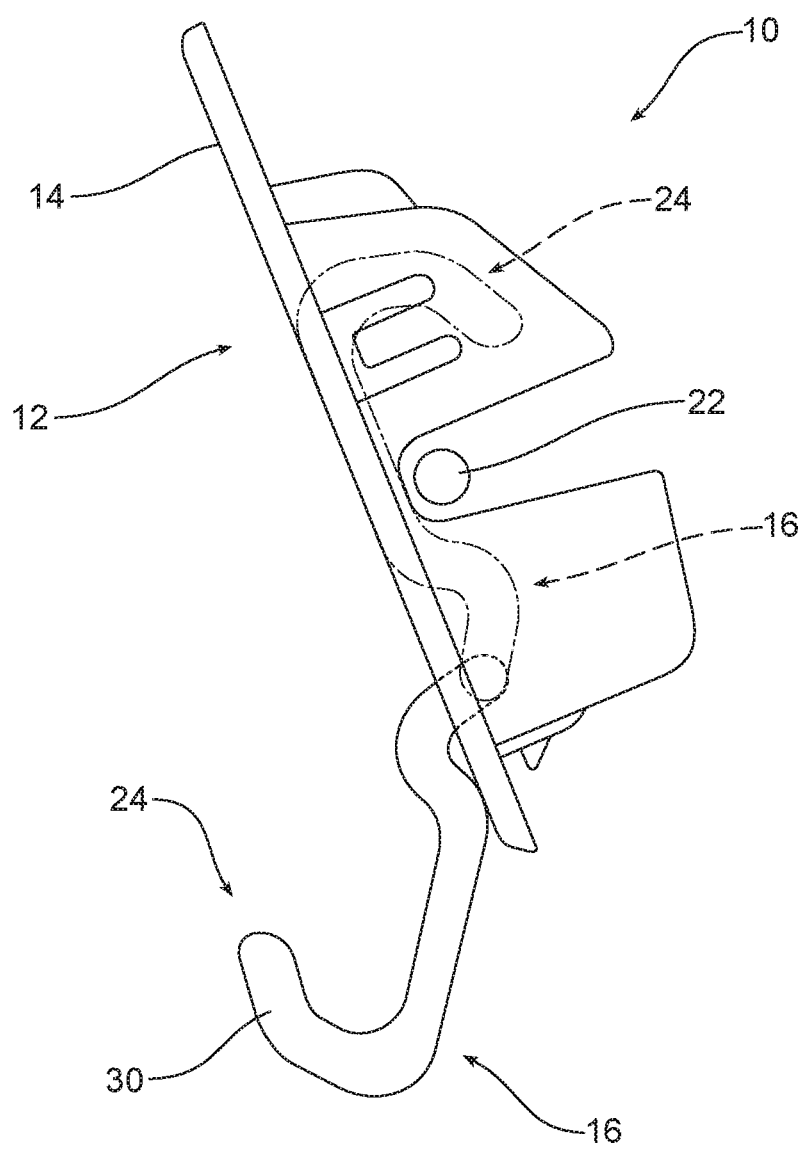

Reference is now made to FIGS. 1 and 2 which illustrate the new and improved apparatus 10 which includes a tether anchor bezel 12 including a housing 14 and a displaceable cover 16. The housing 14 includes a recess 18 defining a compartment 20.

A tether anchor 22 is provided within the tether anchor bezel 12 and, more particularly, extends across the compartment 20 within the recess 18. The tether anchor 22 is made from steel or other high strength material adapted to receive and hold the tether hook H (see also FIGS. 3C and 3D) on the end of a tether strap S of a type used to secure a baby or child safety seat within a vehicle. A hook, generally designated by reference numeral 24, is carried on the displaceable cover 16.

As shown in FIG. 1, the tether anchor bezel 12, and, more particularly, the housing 14 may be positioned and held in a substrate 26 of a motor vehicle such as the rear face of a vehicle seat or a trim panel. That trim panel may be positioned substantially anywhere in the vehicle including on a door, on a quarter panel, on a side trim panel, on a pillar panel, on a storage compartment sidewall panel or any other appropriate panel at any desired position.

Figure 3A:
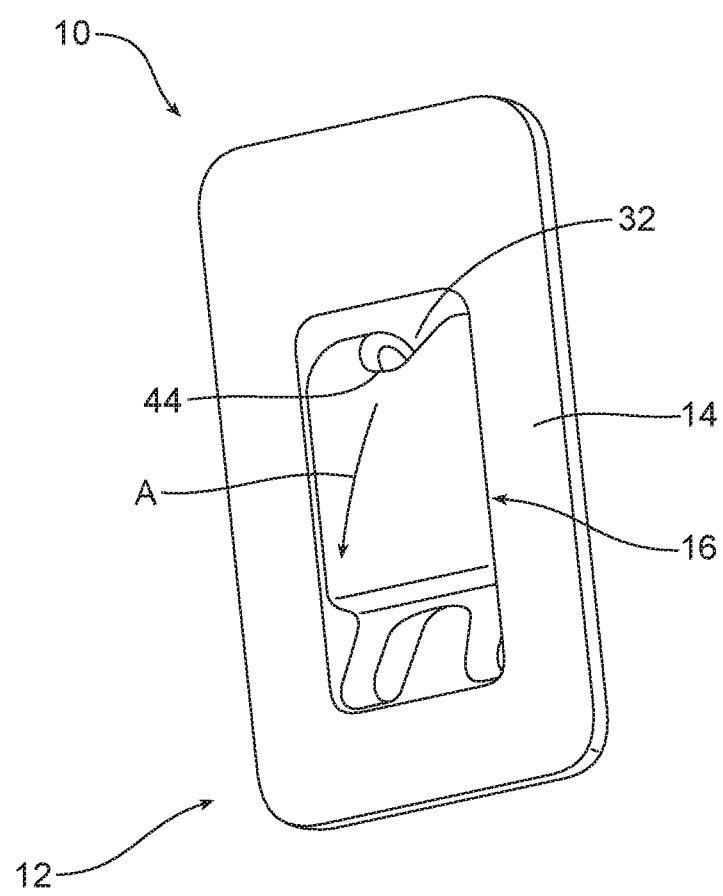
Figure 3B:
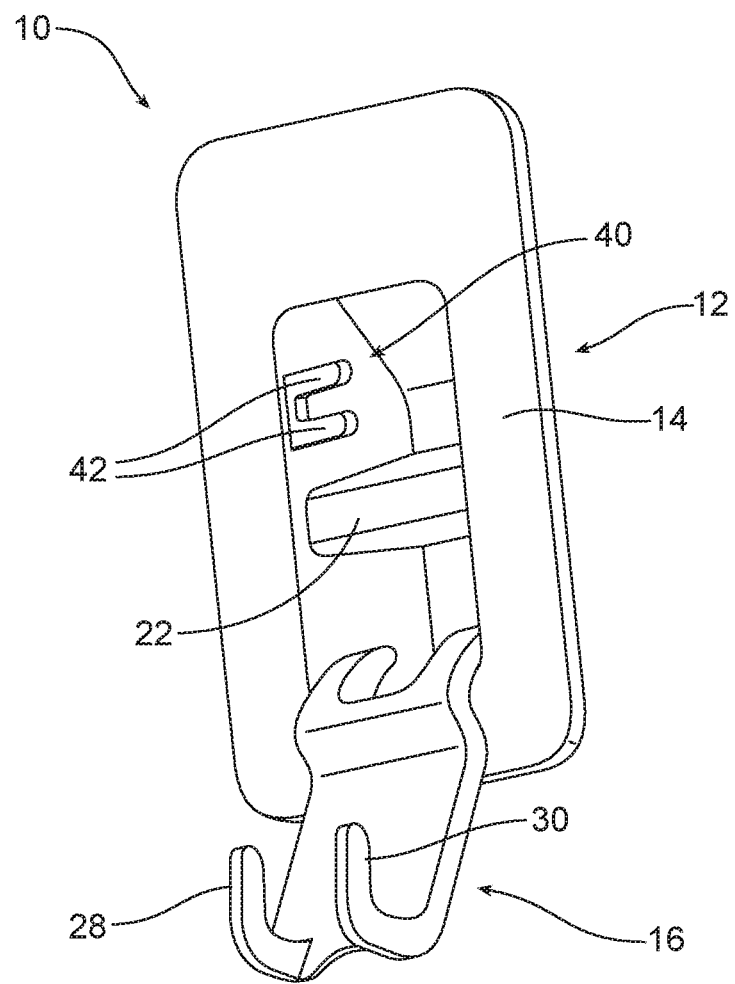

As best illustrated in FIGS. 2, 3A and 3B, the displaceable cover 16 is displaceable between a first or home position, at least partially closing the compartment 20 and concealing the tether anchor 22 (see phantom line illustration in FIG. 2 and full line illustration in FIG. 3A) and a second or deployed position, at least partially opening the compartment and exposing the tether anchor for access (see full line illustration in FIG. 2 and in FIG. 3B). As should be appreciated from viewing FIG. 3A, both the tether anchor 22 and the hook 24 are concealed in the compartment 20 of the housing 14 when the cover 16 is in the first or home position. In contrast, when the cover 16 is in the second or deployed position, the hook 24 is fully exposed for use where it may receive and hold a hanging item I such as the grocery bag illustrated in FIG. 4. Here, of course, it should be appreciated that substantially any item capable of being held by the hook 24 may be hung on the hook including, for example, a purse, sunglasses on a sunglasses strap, a scarf, a hat, gloves, small clothing items, small bags and the like.

Figure 3C:
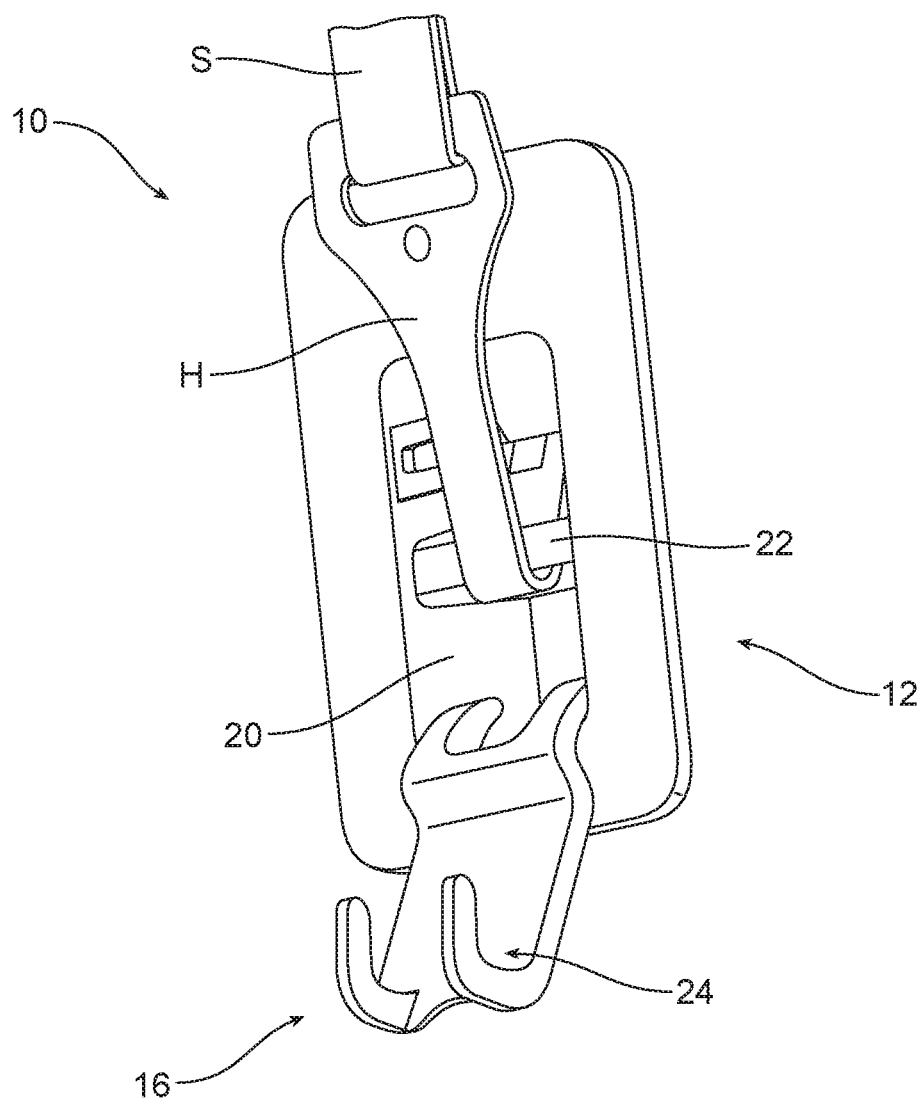
Figure 3D:
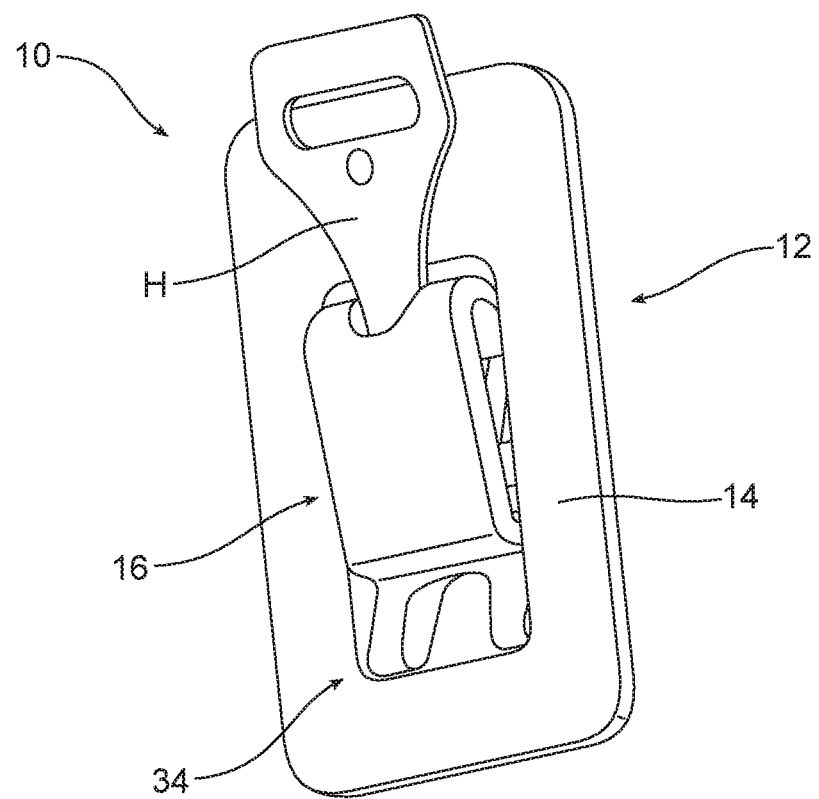

As best illustrated in FIG. 1, the hook 24 may include a first prong 28 and a second prong 30. A tether receiver 32, in the form of an open gap, is provided between the first prong 28 and the second prong 30. As best illustrated in FIGS. 3C and 3D, the tether receiver 32 allows the passage of a tether and, more particularly, the tether hook H between the first prong 28 and the second prong 30 when a tether is connected to the tether anchor 22 and the cover 16 is in at least a partially closed position illustrated in FIG. 3D.

A pivot 34 connects the cover 16 to the housing 14. In the illustrated embodiment, the pivot 34 includes opposed trunnions 36, carried on the hook 24, received and held in opposed sockets 38 provided in the housing 14.

A latch feature, generally designated by reference numeral 40, releasably secures the displaceable cover 16 in the first or home position. In the illustrated embodiment, the latch feature 40 is a resilient forked tab 42 that is carried on the housing 14 and configured to engage at least the first prong 28 when the cover is in the first or home position. The latch feature 40 may also engage and hold the cover in the partially closed position illustrated in FIG. 3D.

Reference is now made to FIGS. 3A-3D illustrating how one connects a tether hook H to the tether anchor 22 of the apparatus 10. In order to displace the displaceable cover 16 from the first or home position shown in FIG. 3A, one may engage the displaceable cover with a finger near the crotch 44 of the tether receiver 32. By applying a force in a downward and outward direction as illustrated by action arrow A, one may easily overcome the force of the latch feature 40 and pivot the displaceable cover 16 into the second or deployed position illustrated in FIG. 3B. This exposes the tether anchor 22. Next, one engages the tether hook H around the tether anchor 22 within the compartment 20 of the housing 14 (see FIG. 3C). After the tether hook H is secured in position and the tether strap S is properly tightened one may pivot the cover 16 upward about the pivot 34 into the partially closed position illustrated in FIG. 3D to conceal the hook 24 and provide a more aesthetically pleasing appearance. The tether receiver 32 between the first prong 28 and second prong 30 of the hook 24 has sufficient clearance to accommodate the tether hook H allowing the displaceable cover 16 to at least be displaced into the partially closed position where the cover is engaged and held by the latch feature 40.

Reference is now made to FIGS. 5A-5D illustrating an alternative embodiment of the apparatus 10'. The only difference between the apparatus 10 illustrated in FIGS. 1, 2, 3A-3D and 4 and the alternative embodiment of the apparatus 10' illustrated in FIGS. 5A-5D is the design of the hook 24'. The tether anchor bezel 12, housing 14, recess 18, and compartment 20 remain unchanged and are identified by the same reference numerals.

The hook 24' illustrated in FIGS. 5A-5D includes a first section 50, a second section 52 and a detent hinge 54 connecting the first section and the second section. More particularly, the first section 50 includes a proximal end 56 and a distal end 58. The proximal end 56 is connected by a pivot 60 to the housing 14. The distal end 58 is connected by the detent hinge 54 to the second section 52.

FIGS. 5A and 5B illustrate the hook 24' in the second or deployed position. The detent hinge 54 functions to bias the second section 52 of the hook into the position illustrated in FIGS. 5A and 5B so that the hook is fully open to receive and hold an item.

As illustrated in FIGS. 5C and 5D, when a force F is applied to the face 62 of the hook 24' as indicated by the action arrows, the second section 52 bends toward the first section 50 about the detent hinge 54. In extreme circumstances where the applied force overcomes the detent hinge 54, the second section 52 actually breaks over the detent hinge 54 until the second section engages the first section. Note FIGS. 5C and 5D illustrate the progressive bending of the hook 24' when subjected to the force F. This bending of the hook 24' will prevent the hook from inadvertently catching on certain items and can help reduce the force of an impact with a knee, elbow or arm when, for example, one is entering or exiting the vehicle and the apparatus 10 is located on the rear face of a vehicle seat with the hook 24' in the deployed position. Stated another way, the shape of the hook 24' illustrated in FIG. 5D is more rounded and impact friendly than that shown in FIGS. 5A and 5B.

Figure 4:
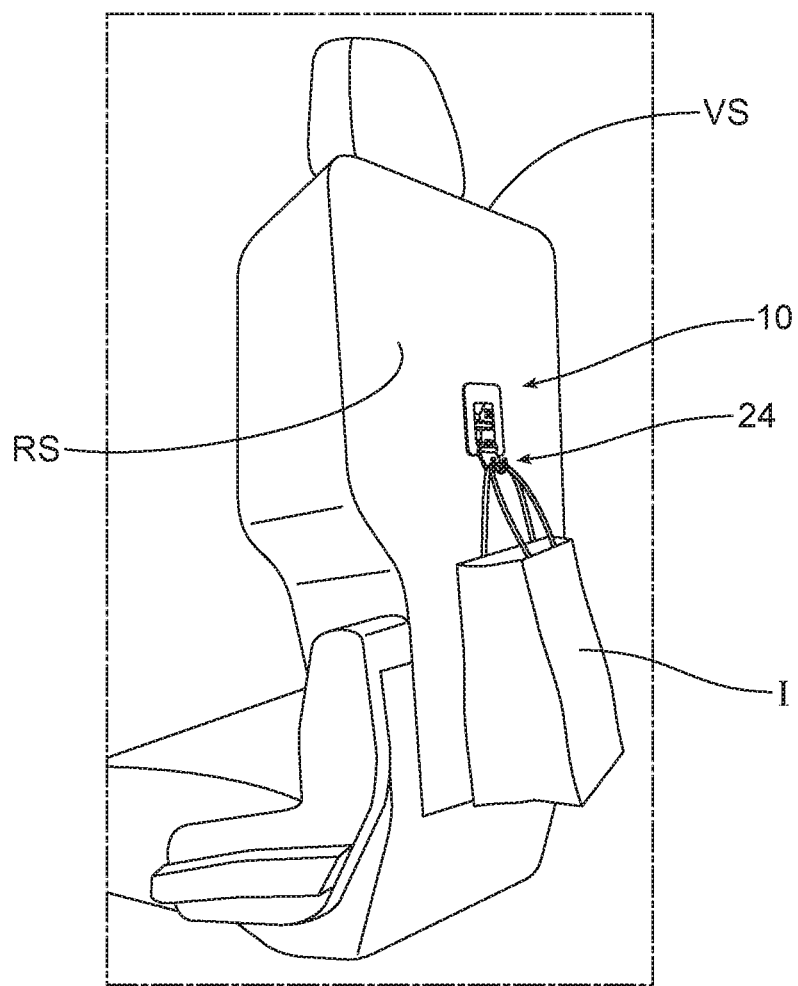
FIG. 4 is a perspective view of a vehicle seat showing the apparatus and, more particularly, the tether anchor bezel of that apparatus held in a rear face of the vehicle seat with the displaceable cover and hook in the second or deployed position holding a shopping bag.

Any embodiment of the apparatus 10, 10' as described above is useful in a method of securing an item I for transport in a vehicle. That method may comprise the steps of: (a) displacing the cover 16 or the hook 24' of a tether anchor bezel 12 into a second or deployed position such as illustrated in FIG. 4 and engaging a portion of the item I (such as the handle on the grocery bag shown) with the hook 24 carried on the cover 16 and exposed for use in the deployed position. In FIG. 4, the apparatus 10 is carried on the rear surface RS of a vehicle seat VS. Here, it should be appreciated that the apparatus 10 may also be carried on or mounted to a trim panel at substantially any location in the vehicle where a user might desire to have a hook for receiving and holding an item I.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
   a tether anchor bezel including a housing and a displaceable cover;
   a tether anchor within said tether anchor bezel; and
   a hook carried on said displaceable cover, wherein said hook has a distal end that extends generally toward said tether anchor bezel when the displaceable cover is in an at least partially open position, and wherein said hook is configured to support an object that may be hung from the hook.

2. The apparatus of claim 1, wherein said housing includes a recess defining a compartment.

3. The apparatus of claim 2, wherein said tether anchor extends across said compartment within said recess.

4. The apparatus of claim 2, wherein said displaceable cover is displaceable between a first position, at least partially closing said compartment and concealing said tether anchor, and a second position, at least partially opening said compartment and exposing said tether anchor for access.

5. The apparatus of claim 4, wherein said hook is concealed in said compartment when said displaceable cover is in said first position and exposed for use when said cover is in said second position.

6. The apparatus of claim 5, wherein said hook includes a first prong and a second prong.

7. The apparatus of claim 6, further including a tether receiver between said first prong and said second prong allowing passage of a tether between said first prong and said second prong when a tether is connected to said tether anchor and said displaceable cover is in at least a partially closed position.

8. The apparatus of claim 7, further including a pivot connecting said displaceable cover to said housing.

9. The apparatus of claim 8, further including a latch feature releasably securing said displaceable cover in said first position.

10. The apparatus of claim 9, wherein said latch feature is a resilient tab carried on said housing and configured to engage at least one of said first prong and said second prong when said displaceable cover is in said first position.

11. The apparatus of claim 10, wherein said pivot includes opposed trunnions on said displaceable cover received in opposed sockets in said housing.

12. The apparatus of claim 1, wherein said hook includes a first prong and a second prong.

13. The apparatus of claim 1, further including a pivot connecting said displaceable cover to said housing.

14. The apparatus of claim 1, wherein said tether anchor bezel is held in a rear face of a motor vehicle seat.

15. The apparatus of claim 1, wherein said tether anchor bezel is held in a trim panel.

16. The apparatus of claim 1, wherein said tether anchor bezel further comprises a forked tab within said tether anchor bezel.

17. An apparatus, comprising:
   a tether anchor bezel including a housing;
   a tether anchor within said tether anchor bezel; and
   a hook carried on said housing, said hook including a first section, a second section and a hinge connecting said first section and said second section, wherein said second section deforms at said hinge and toward said first section when a force directed towards said first section is applied on said second section.

18. The apparatus of claim 17, wherein said first section includes a proximal end and a distal end, said proximal end being connected to said housing by a pivot and said distal end being connected to said second section by said hinge.

19. The apparatus of claim 18, wherein said hinge biases said hook into an open position for receiving and holding an item.

20. A method of securing an item for transport in a vehicle having a tether anchor bezel, including a tether anchor configured to engage a tether hook, comprising:
   displacing a cover of a tether anchor bezel into a deployed position; and
   engaging a portion of said item with a hook that is carried on said cover and exposed for use in said deployed position.

* * * * *